US012273981B2

(12) United States Patent
Secretin

(10) Patent No.: US 12,273,981 B2
(45) Date of Patent: Apr. 8, 2025

(54) MULTI-PROTOCOL LUMINAIRE SYSTEM

(71) Applicant: SCHREDER S.A., Brussels (BE)

(72) Inventor: Laurent Secretin, Remicourt (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/476,070

(22) Filed: Sep. 27, 2023

(65) Prior Publication Data

US 2024/0023221 A1 Jan. 18, 2024

Related U.S. Application Data

(63) Continuation of application No. 17/279,798, filed as application No. PCT/EP2019/075147 on Sep. 19, 2019, now Pat. No. 11,792,905.

(30) Foreign Application Priority Data

Sep. 25, 2018 (NL) ..................................... 2021705

(51) Int. Cl.
*H05B 47/19* (2020.01)

(52) U.S. Cl.
CPC .................................... *H05B 47/19* (2020.01)

(58) Field of Classification Search
CPC .... H05B 47/105; H05B 47/185; H05B 47/19; H05B 45/10; H05B 47/115; H05B 47/175; A63B 2024/0081; A63B 2071/0625; A63B 2071/0647; A63B 2071/065; A63B 2071/1258; A63B 2220/40; A63B 2220/53; A63B 2220/62; A63B 2225/50; A63B 2225/74; A63B 2230/04; A63B 2230/40; A63B 2230/75; A63B 24/0003; A63B 24/0084; A63B 69/305; A63B 71/0616;
(Continued)

(56) References Cited

U.S. PATENT DOCUMENTS

2012/0143383 A1 6/2012 Cooperrider et al.
2014/0028200 A1 1/2014 Van Wagoner et al.
(Continued)

FOREIGN PATENT DOCUMENTS

EP 3163981 A1 5/2017

OTHER PUBLICATIONS

PCT International Search Report and Written Opinion, PCT Application No. PCT/EP2019/075147, mailed Oct. 23, 2019, 11 pages.

*Primary Examiner* — Monica C King
(74) *Attorney, Agent, or Firm* — McDonnell Boehnen Hulbert & Berghoff LLP

(57) ABSTRACT

A luminaire system comprising: a light module with at least one light source; a first peripheral interface device and a second peripheral interface device; a first interface configured to receive first signals from the first peripheral interface device using a first protocol; a second interface configured to send second signals to the second peripheral interface device using a second protocol; wherein the first protocol and the second protocol are different; a transfer module configured to transfer first data content included in a first input signal received at the first interface and/or first processed data based on said first data content, to the second interface; a control means configured to control the signaling between the first interface, the transfer module and the second interface.

19 Claims, 2 Drawing Sheets

(58) Field of Classification Search
CPC ............ A63B 71/0622; A63B 71/0669; A63B 71/0686; A63B 71/1225; A63B 71/145
See application file for complete search history.

(56) References Cited

U.S. PATENT DOCUMENTS

| | | | | |
|---|---|---|---|---|
| 2015/0130365 | A1 | 5/2015 | Kim et al. | |
| 2015/0245451 | A1 | 8/2015 | Sung et al. | |
| 2017/0188438 | A1 * | 6/2017 | Vollmer | H05B 45/12 |

* cited by examiner

MULTI-PROTOCOL LUMINAIRE SYSTEM

CROSS-REFERENCE TO RELATED APPLICATION

The present application is a continuation of U.S. patent application Ser. No. 17/279,798, filed Mar. 25, 2021, which is a national phase entry of PCT/EP2019/075147, filed Sep. 19, 2019, which claims priority to Netherlands patent application number NL2021705, filed on Sep. 25, 2018, the contents of each which are herewith incorporated by reference.

FIELD OF THE INVENTION

The invention relates to luminaire systems, and more in particular to luminaire systems with peripheral interface devices which are configured for communicating using different protocols.

BACKGROUND

State-of-the-art luminaire systems comprise one or more light modules and one or more peripheral interface devices, such as sensors or communication devices. Examples of such peripheral interface devices are: a camera, a light sensor, a particle sensor, a microphone, a radar, a loudspeaker, a wireless communication device, a motion sensor, etc.

Typically, those peripheral interface devices are configured to communicate with other devices using a particular protocol. When multiple peripheral interface devices are included in the same luminaire system, the exchange of data between those peripheral interface devices is limited or non-existing because different peripheral interface devices typically use different protocols.

SUMMARY

It is an object of embodiments of the invention to provide a luminaire system capable of integrating peripheral interface devices in an enhanced way, allowing a more advanced communication between peripheral interface devices.

According to a first aspect of the invention, there is provided a luminaire system comprising a light module with at least one light source, a first peripheral interface device, a second peripheral interface device, a first interface, a second interface, a transfer module, and a control means. The first interface is configured to receive first signals from the first peripheral interface device using a first protocol. The second interface is configured to send second signals to the second peripheral interface device using a second protocol. The first protocol and the second protocol are different. The transfer module is configured to transfer first data content included in a first input signal received at the first interface and/or first processed data based on said first data content, to the second interface. The control means is configured to control the signaling between the first interface, the transfer module and the second interface such that, when said first input signal is received, a second output signal according to the second protocol is generated at said second interface, said second output signal including said first data content and/or said first processed data.

For example, the control means may control the retrieval of first data content included in a first input signal received at the first interface according to a first protocol, may optionally process said first data content to obtain first processed data, wherein the first data content and/or the first processed data may be stored by the transfer module. The control means may then control the inclusion of the stored first data content and/or the first processed data into a second output signal to be sent using the second protocol. In that manner, the first and second peripheral device may exchange data, without the need to have peripheral devices which use the same protocol.

Preferably, the first interface is a first transceiver interface configured to receive and send first signals from and to the first peripheral interface device using the first protocol; and/or the second interface is a second transceiver interface configured to receive and send second signals from and to the second peripheral interface device using the second protocol. The transfer module may then be configured to transfer second data content included in a second input signal received at the second interface and/or second processed data based on said second data content, to the first interface; and the control means may be configured to control the signaling between the second interface, the transfer module and the first interface such that, when the second input signal is received, a first output signal according to the first protocol is generated at said first interface, said first output signal including said second data content and/or said second processed data. In that manner data can be communicated from the first peripheral device to the second peripheral device, and vice versa.

Preferably, the first and second interface, the transfer module, and the control means are configured such that the first and second interface can be used independently, such that signaling using the first protocol and signaling using the second protocol can take place independently of each other, and optionally simultaneously.

Preferably, the luminaire system comprises luminaire head with a luminaire housing containing the light module, and the first and second interface, the transfer module and the control means are arranged in the luminaire housing. The first and/or second peripheral interface device may be arranged on the luminaire housing or integrated in the luminaire housing. Also, the first and/or second peripheral interface device may be mounted on or integrated in a luminaire pole, or may be provided on a bracket attached to the luminaire pole or luminaire housing. More generally, the first and/or second peripheral interface device may be provided anywhere in or near the luminaire head or the luminaire pole.

Preferably, the first and/or second peripheral interface device are any one of the following: a sensor, a communication device. More in particular, the first and/or second peripheral interface device may be any one of the following: a light sensor, a particle sensor, a camera, a microphone, a radar, a loudspeaker, a wireless communication device, a motion sensor, an image sensor, a display, a voice recorder, a detector of smoke, an antenna configured for receiving and emitting cellular data, a telecommunication device for wired or wireless communication, WiFi circuitry, charger circuitry, a human interface device (HID), a signaling device, a mechanical and/or electrical plug-in device.

Preferably, the first protocol and the second protocol are any one of the following: Communication Area Network (CAN), Digital Addressable Lighting Interface (DALI), Universal Asynchronous Receiver-Transmitter (UART), 1-10V, $I^2C$, RS485, USB, Ethernet, Local Interconnect Network (LIN), an analogue communication protocol such as an analog 4-20 mA current loop protocol used for electronic signaling. It is also possible to use a wireless protocol, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN), but this is generally not preferred.

Preferably, the luminaire system further comprises a driver comprising a driver housing with input connector elements for connection to a power supply and output connector elements for connection to the at least one light source; and driver circuitry arranged in said driver housing and adapted to perform a driving functionality of the at least one light source. Preferably, the driver circuitry comprises voltage-to-current regulating circuitry. Such converter circuitry is preferred when the light module comprises light emitting diodes. In that manner, a plurality of light emitting diodes connected in series can be easily provided with a drive current. In alternative embodiments, a voltage-to-voltage converter circuitry may be used. Optionally the driver circuitry further comprises rectifier circuitry downstream of the converter circuitry.

The first and the second interface may be provided in or on the driver housing. If the first and the second interface are provided in the driver housing, the driver housing may be provided with at least one first and second control connector element for being connected to the first and second peripheral interface device, respectively.

The driver circuitry may be configured to drive not only the at least one light source, but may be configured to drive also other components of the luminaire system, e.g. the first and/or second peripheral interface device. The driver housing may then be provided with output connector elements for connection to the first and/or second peripheral interface device.

Preferably, the first and/or the second interface is configured to directly or indirectly (e.g. through the control means) control the driver circuitry. It is possible that e.g. only the first interface is connected to the driver circuitry, and that the second interface is not connected to the driver circuitry.

The first and the second interface may be provided in or on the driver housing. The driver housing may be provided with at least one first and second control connector element connected to the first and the second interface, respectively.

Preferably, the input connector elements and/or the output connector elements and/or the at least one first and second control connector element are any one of the following: a connection wire, a connector plug, a connector pin, a connector socket, a terminal block, or any combination thereof.

In a possible embodiment, the driver housing may be provided with a receiving means configured for receiving at least one pluggable module, such that the at least one pluggable module can be received from outside of the driver housing. The at least one pluggable module may comprise at least a portion of the first and/or second interface and/or of the transfer module and/or of the control means. For example, the pluggable module may comprise a first circuitry associated with the first protocol and a second circuitry associated with the second protocol. Alternatively, a first pluggable module may comprise a first circuitry associated with the first protocol and a second pluggable module may comprise a second circuitry associated with the second protocol. The receiving means may then be configured such that at least one of the first circuitry and the second circuitry is connected to the driver circuitry when the one or more pluggable modules are plugged in the receiving means, and the at least one first and second control connector element may be connected to the first and second circuitry, respectively, when the one or more pluggable modules are plugged in the receiving means. In that manner, the driver is given additional functionalities in a modular way. The at least one first and second control connector element are connected to the first and second circuitry, respectively, when the one or more pluggable modules are plugged in the receiving means, such that input and/or output control signals can be sent and/or received to/from the first and second circuitry. First input and/or output signals can be sent to and/or received from the first circuitry using the first protocol, allowing the at least one first control connector element to be connected to the first peripheral interface device. Similarly, second input and/or output signals can be sent to and/or received from the second circuitry using the second protocol, allowing the at least one second control connector element to be connected to the second peripheral interface device. In other words, the pluggable module(s) can be selected in function of the first and second peripheral interface devices present in the luminaire, and the driver can be extended with the required functionalities in a very convenient manner using the selected pluggable module(s), without the need for redesigning the driver.

The driver housing may be provided with at least one recess for receiving the at least one pluggable module, wherein the recess forms a part of the receiving means. The driver housing may comprise internal circuitry configured to recognize the presence and/or the type of the at least one pluggable module when plugged-in. Preferably, the receiving means and the pluggable module are configured such that the pluggable module is removable. In that manner the pluggable module may be easily removed and changed for another pluggable module, e.g. when the first and/or second peripheral interface devices have changed.

According to a preferred embodiment, the control means comprises digital signal processing circuitry. This may be useful e.g. if the data received by the first and/or second interface needs to be further processed into a suitable control signal for controlling the driver circuitry, and/or if data obtained e.g. from the driver circuitry needs to be processed before sending it to the first and/or second peripheral interface device.

According to a preferred embodiment, the first protocol is a dimming protocol, such as DALI or 1-10V, and the second protocol is a communication bus protocol such as CAN-bus, SPI or $I^2C$.

One or more features of the above or below described embodiments may be combined with features of the independent claims to a new embodiment of the invention.

BRIEF DESCRIPTION OF THE FIGURES

The accompanying drawings are used to illustrate presently preferred non-limiting exemplary embodiments of luminaire drivers and systems of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
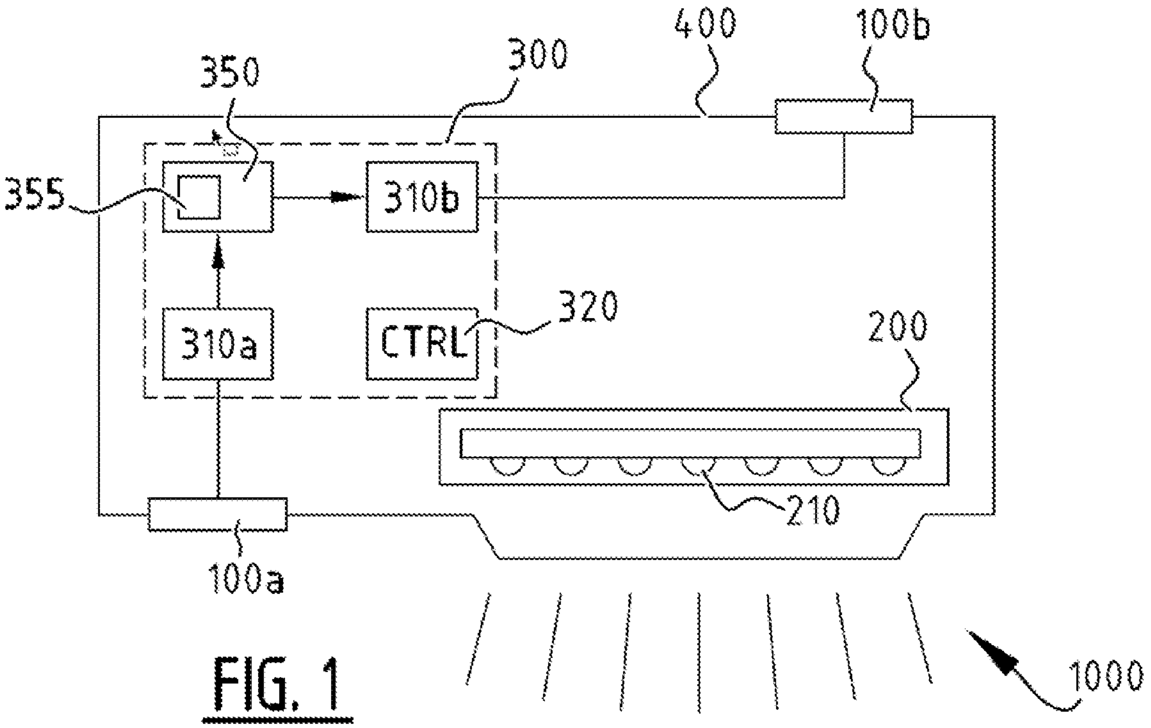
FIG. 1 schematically illustrates a view of an exemplary embodiment of a luminaire system.

FIG. 1 schematically illustrates a perspective view of an exemplary embodiment of a luminaire system comprising a light module 200 with at least one light source 210, a first peripheral interface device 100*a*, a second peripheral interface device 100*b*, a first interface 310*a*, a second interface 310*b*, a transfer module 350 and a control means 320.

The luminaire system may comprise a luminaire head 1000 with a luminaire housing 400 and a luminaire pole (not shown). The luminaire head 1000 may be connected in any manner known to the skilled person to the luminaire pole. Typical examples of such systems are street lights. In other non-illustrated embodiments, a luminaire head 1000 may be connected to a wall or a surface, e.g. for illuminating buildings or tunnels. The light module 200 is arranged in the luminaire housing 400. Typically, the light module 200 comprises a plurality of light sources 210, e.g. a plurality of light emitting diodes, preferably mounted on a carrier such as a PCB.

The first interface 310*a* is configured to receive first signals from the first peripheral interface device 100*a* using a first protocol. The second interface 310*b* is configured to send second signals to the second peripheral interface device 100*b* using a second protocol. It is assumed here that the first protocol and the second protocol are different.

The transfer module 350 is configured to transfer first data content included in a first input signal received at the first interface 310*a* and/or first processed data based on said first data content, to the second interface 310*b*. The control means 320 is configured to control the signaling between the first interface 310*a*, the transfer module 350 and the second interface 310*b* such that, when said first input signal is received, a second output signal according to the second protocol is generated at said second interface, said second output signal including said first data content and/or said first processed data. The transfer module 350 comprises a storage means 355 configured to store data content included in the first and/or second signals, or processed data content derived from said data content.

The first and second interface 310*a*, 310*b*, as well as the transfer module 350 and the control means 320 are arranged in the luminaire housing 400. The first and/or second peripheral interface device 100*a*, 100*b* may be arranged on the luminaire housing 400 or integrated in the luminaire housing 400. Also, the first and/or second peripheral interface device 100*a*, 100*b* may be mounted on or integrated in a luminaire pole, or may be provided on a bracket attached to the luminaire pole or to luminaire housing 400. More generally, the first and/or second peripheral interface device 100*a*, 100*b* may be provided anywhere in or near the luminaire head 1000 or luminaire pole. Preferably, the first and/or second peripheral interface device 100*a*, 100*b* are any one of the following: a sensor, a communication device. More in particular, the first and/or second peripheral interface device 100*a*, 100*b* may be any one of the following:

- a light sensor, a particle sensor, a microphone, a radar, a motion sensor, a sound sensor, a voice recorder, a detector of smoke, an image sensor, etc., and the associated circuitry;
- an antenna configured for receiving and emitting cellular data;
- a telecommunication device for wired or wireless communication, which can comprise at least one of: an optical fibre connection, a fibre to copper interface, a fibre patch panel, a modem, a router, a switch, a patch panel, a network video recorder (NVR), a computer;
- WiFi circuitry;
- charger circuitry, e.g. phone/computer/tablet charger circuitry or vehicle charger circuitry; or UAV charger circuitry (e.g. drone charger circuitry);
- any human interface device (HID) and the associated circuitry, e.g. a camera, a loudspeaker, a button, a display, etc.
- a signaling device, e.g. a light ring capable of performing signaling;
- a mechanical and/or electrical plug-in device, e.g. a universal plug-in module, e.g. a mechanical device to fix a flag, a waste bin, etc.; a socket plug-in device.

Preferably, the first protocol and the second protocol are any one of the following: Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), an analogue communication protocol such as an analog 4-20 mA current loop protocol used for electronic signaling.

Figure 2:
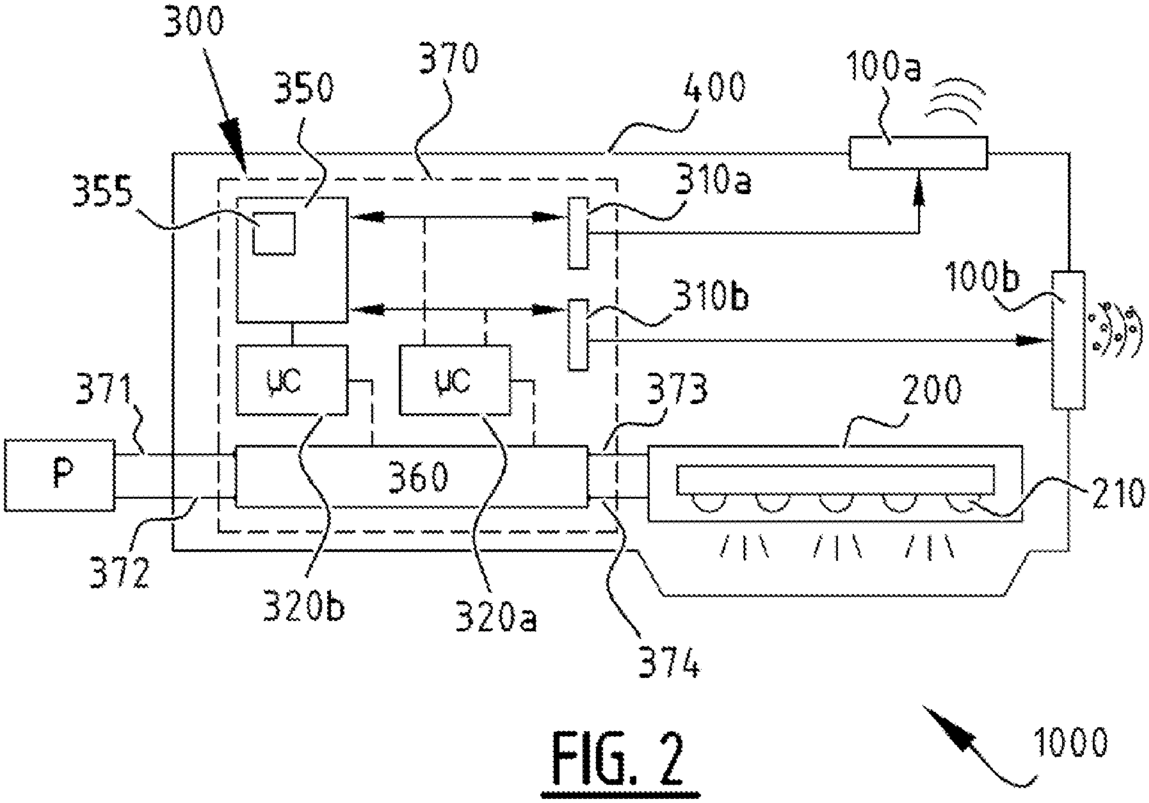
FIG. 2 schematically illustrates a more detailed exemplary embodiment of a luminaire system.

FIG. 2 illustrates a more detailed exemplary embodiment of a luminaire system with a luminaire head 1000 comprising a luminaire housing 400. The luminaire system comprises a light module 200 with at least one light source 210, a first peripheral interface device 100*a*, a second peripheral interface device 100*b*, a first interface 310*a*, a second interface 310*b*, a transfer module 350, and a control means 320*a*, 320*b*. The first interface 310*a* may be a first transceiver interface 310*a* configured to receive and send first signals from and to the first peripheral interface device 100*a* using the first protocol. The second interface 310*b* may be a second transceiver interface 310*b* configured to receive and send second signals from and to the second peripheral interface device 100*b* using the second protocol.

The transfer module 350 is configured to transfer first data content included in a first input signal received at the first interface 310*a* and/or first processed data based on said first data content, to the second interface 310*b*. The control means 320 is configured to control the signaling between the first interface 310*a*, the transfer module 350 and the second interface 310*b* such that, when said first input signal is received, a second output signal according to the second protocol is generated at said second interface 310*b*, said second output signal including said first data content and/or said first processed data. The transfer module 350 comprises a storage means 355 configured to store data content included in the first and/or second signals, or processed data content derived from said data content. Further, the transfer module 350 is configured to transfer second data content included in a second input signal received at the second interface 310*b* and/or second processed data based on said second data content, to the first interface 310*a*, and the control means 320 is configured to control the signaling between the second interface 310*b*, the transfer module 350 and the first interface 310*a*, such that, when the second input signal is received, a first output signal according to the first protocol is generated at said first interface 310*a*, said first output signal including said second data content and/or said second processed data.

The first peripheral interface device 100*a* may be e.g. a wireless communication device configured to communicate wirelessly (e.g. through 4G) with a remote device, and to communicate using the first protocol (e.g. DALI) with the first interface 310*a*. The second peripheral interface device 100*b* may be e.g. a sensor device configured to communicate using the second protocol, e.g. CAN, with the second interface 310*b*.

Further, a luminaire driver 300 for driving the light module 200 is provided. The luminaire driver 300 is shown to be arranged in the luminaire housing 400. However, in other embodiments the luminaire driver 300 may be arranged on the luminaire housing 400, on or in the luminaire pole, or in any other location near the luminaire. The luminaire driver 300 comprises a driver housing 370 with input connector elements 371, 372 for connection to a power supply P and output connector elements 373, 374 for connection to the at least one light source 210; and driver circuitry 360 arranged in said driver housing 370 and adapted to perform a driving functionality of the at least one light source 210. The first and the second interface 310*a*, 310*b* may be provided in or on the driver housing 370. The driver circuitry 360 may comprise converter circuitry, e.g. voltage-to-current regulating circuitry for providing a drive current to the at least one light source 210. Further the driver circuitry 360 may be configured to provide power to the first and/or second peripheral interface device 100*a*, 100*b*, and/or the first and/or second interface 310*a*, 310*b*, and/or the transfer module 350 and/or the control means 320*a*, 320*b* (not illustrated).

Optionally, the driver housing 370 is provided with a receiving means (not shown) configured for receiving at least one pluggable module, such that the at least one pluggable module can be received from outside of the driver housing 370. The at least one pluggable module may comprise at least a portion of the first and/or second interface 310*a*, 310*b* and/or of the transfer module 350 and/or of the control means 320*a*, 320*b*. To that end, the driver housing 370 may be provided with at least one recess for receiving the at least one pluggable module.

Figure 3:
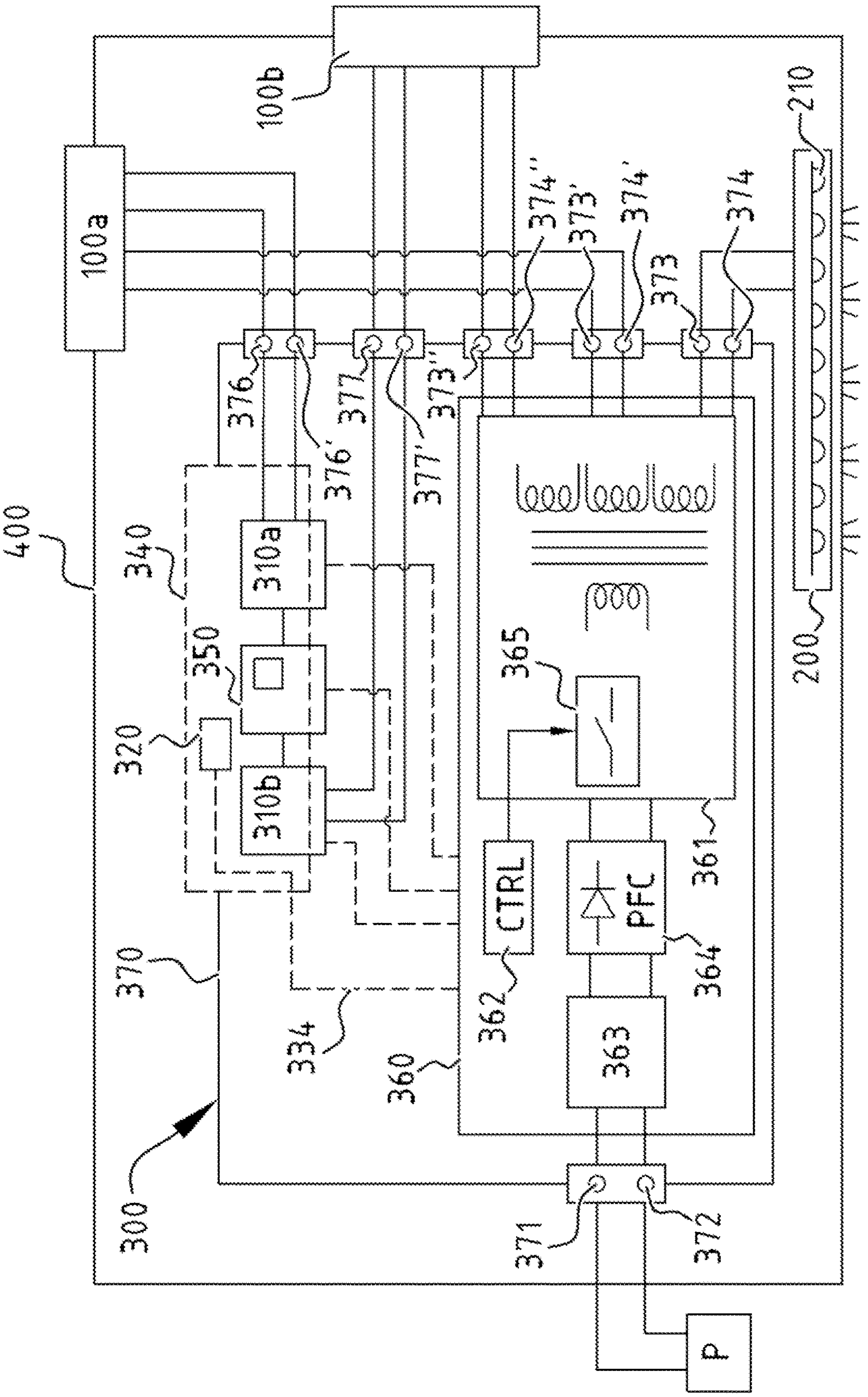
FIG. 3 schematically illustrates an exemplary embodiment of a luminaire driver for driving both at least one light source as well as a peripheral interface device of the luminaire.

FIG. 3 illustrates an exemplary embodiment of a luminaire system with a luminaire driver 300 arranged in a luminaire housing 400. The luminaire system further comprises a light module 200 with at least one light source 210, a first peripheral interface device 100*a*, a second peripheral interface device 100*b*, a first interface 310*a*, a second interface 310*b*, a transfer module 350, and a control means 320. The first and/or second peripheral interface device 100*a*, 100*b* may be arranged on the luminaire housing 400 or integrated in the luminaire housing 400. More generally, the first and/or second peripheral interface device 100*a*, 100*b* may be provided anywhere in or near the luminaire head or luminaire pole. Preferably, the first and/or second peripheral interface device 100*a*, 100*b* are any one of the following: a sensor, a communication device.

The luminaire driver 300 comprises a driver housing 370 with input connector elements 371, 372 for connection to a power supply P, output connector elements 373, 374 for connection to the at least one light source 210, output connector elements 373', 374' for connection to the first peripheral interface device 100*a*, output connector elements 373", 374" for connection to the second peripheral interface device 100*b*, and with a first and second control connector elements 376, 376', 377, 377'. The input connector elements 371, 372 and/or the output connector elements 373, 374; 373', 374'; 373", 374" and/or the first and second control connector elements 376, 376', 377, 377' may be any one of the following: a connection wire, a connector plug, a connector pin, a connector socket, a terminal block, or any combination thereof.

A driver circuitry 360 is arranged in the driver housing 370 between said input connector elements 371, 372 and said output connector elements 373, 374; 373', 374'; 373", 374", and adapted to perform a driving functionality of the at least one light source 210 and of the first and second peripheral interface device 100*a*, 100*b*. In other embodiments, the first and/or second peripheral interface device 100*a*, 100*b* may be provided with its own power supply. The first and the second interface 310*a*, 310*b*, the transfer module 350 and the control means 320 may be provided in or on the driver housing 370. The driver circuitry 360 may comprise voltage-to-current regulating circuitry. Looking in a downstream direction from the power supply input connector elements 371, 372 towards the output connector elements 373, 374; 373', 374'; 373", 374", the driver circuitry 360 comprises a filtering circuitry 363, a rectifier circuitry 364 with optional smoothing and power factor correction circuitry, and a power switching converter circuitry 361. The filtering circuitry 363 may be designed to filter out high frequency noise generated by the power switching converter circuitry 361. It may also include one or more protective components such as a varistor to filter out electrical transients from the power supply P, typically an electrical grid. The rectifier circuitry 364 may include one or more components, such as diodes, transistors, capacitors, and/or resistors, arranged to rectify the voltage between the first and second power supply input connector elements 371, 372. The rectifier circuitry 364 may include e.g. a passive diode bridge rectifier. The rectifier circuitry 364 may further include one or more components arranged to smoothen and/or otherwise condition the rectified DC voltage, and/or a passive component, such as inductor and capacitor, to perform a power factor correction. The power switching converter circuitry 361 includes a transformer with at least one primary side winding and at least one secondary side winding, preferably with a galvanic insulation between the primary side and the secondary side. The power switching converter circuitry 361 may comprise e.g. a flyback converter, a buck converter, a boost converter, etc.

The driver circuitry 360 may also comprise control circuitry 362 configured for controlling the converter circuitry 361, and in particular a switching element 365 of the converter circuitry 361, in function of a signal received from the control means 320, which signal may be based on a data received through the first control connector elements 376, 376' and/or the second control connector elements 377, 377'. It is noted that the control means 320 and the control circuitry 362 may be implemented in a single unit or module. The transfer module 350 comprises a storage means 355 configured to store data content included in the first and/or second signals received through the first control connector elements 376, 376' and/or the second control connector elements 377, 377', or processed data content derived from said data content. In addition or alternatively, such storage means may also be part of the control circuitry 362.

The converter circuitry 361 may comprise voltage-to-current converter circuitry configured for generating a drive current for the at least one light source 210, as well as other converter circuitry configured for generating a drive current or voltage suitable for driving the peripheral interface devices 100*a*, 100*b*, which may be any one of the devices listed above in connection with FIG. 1. Further the driver circuitry 360 may be configured to provide power to the first and/or second interface 310*a*, 310*b*, and/or to the transfer module 350 and/or to the control means 320, see the connections 331, 332, 333, 334. Those connections 331, 332, 333, 334 may each comprise a power line and/or a control data line.

Optionally, the driver housing 370 is provided with a receiving means (not shown) configured for receiving at least one pluggable module 340, such that the at least one pluggable module 340 can be received from outside of the driver housing 370. The at least one pluggable module 340 may comprise at least a portion of the first and/or second interface 310*a*, 310*b* and/or of the transfer module 350 and/or of the control means 320. The driver housing 370 may be provided with at least one recess for receiving the at least one pluggable module 340, said recess forming a portion of the receiving means. In other embodiments, the receiving means may be only partly situated in the driver housing 370, or may not be part of the driver housing 370. For example, the receiving means could also have a separate housing mounted on the driver housing 370. The receiving means is configured such that the pluggable module 340 can be received from outside of the driver housing 370. The receiving means may comprise a mechanical means comprising a biunique fitting mechanism configured to hold the pluggable module 340. In addition, the receiving means and the pluggable module 340 may be configured such that the pluggable module 340 is removable.

When the pluggable module 340 is plugged in the receiving means, the control means 320 may be connected to the driver circuitry 360. Also the first and/or second interface 310*a*, 310*b* and/or the transfer module 350 may be connected to the driver circuitry 360. The receiving means may be configured such that the first and/or second interface 310*a*, 310*b* and/or the transfer module 350 are directly or indirectly connected to the driver circuitry 360, e.g. via the control means 320, when the pluggable module 340 is plugged in the receiving means.

In addition, when the pluggable module 340 is plugged in the receiving means the first and second control connector elements 376, 376', 377, 377' are connected to the first and second interface 310*a*, 310*b*, respectively. The first and second control connector elements 376, 376', 377, 377' are arranged such that they are accessible by a user from outside of the driver housing 370. The number of first and second control connector elements may be chosen in function of the type of peripheral interface device. The luminaire driver 300 may further comprise internal circuitry (not shown) configured to recognize the presence and/or the type of the pluggable module 340 when the pluggable module 340 is plugged-in in the receiving means. In such case, the luminaire driver 300 may further comprise signal switching and/or signal adaption circuitry (not shown). The internal circuitry may be configured to set the signal switching and/or signal adaption circuitry in function of the recognized type of pluggable module 340.

Whilst the principles of the invention have been set out above in connection with specific embodiments, it is to be understood that this description is merely made by way of example and not as a limitation of the scope of protection which is determined by the appended claims.

What is claimed is:

1. A luminaire system comprising:

a light module with at least one light source;

a first peripheral interface device and a second peripheral interface device;

a first interface configured to receive first signals from the first peripheral interface device using a first protocol;

a second interface configured to send second signals to the second peripheral interface device using a second protocol, wherein the first protocol and the second protocol are different;

a transfer module configured to transfer first data content included in a first input signal received at the first interface and/or first processed data based on said first data content, to the second interface;

a control means configured to control the signaling between the first interface, the transfer module and the second interface such that, when said first input signal is received, a second output signal according to the second protocol is generated at said second interface, said second output signal including said first data content and/or said first processed data; and wherein the first peripheral interface device is a first communication device and the second peripheral device is a second communication device; and wherein:

the first interface is a first transceiver interface configured to receive and send first signals from and to the first peripheral interface device using the first protocol; and the second interface is a second transceiver interface configured to receive and send second signals from and to the second peripheral interface device using the second protocol, wherein the transfer module is configured to transfer second data content included in a second input signal received at the second interface and second processed data based on said second data content, to the first interface, and wherein the control means is configured to control the signaling between the second interface, the transfer module and the first interface such that, when the second input signal is received, a first output signal according to the first protocol is generated at said first interface, said first output signal including said second data content and said second processed data.

2. The luminaire system according to claim 1, further comprising a luminaire housing containing the light module, wherein the first and second interface, the transfer module and the control means are arranged in the luminaire housing.

3. The luminaire system according to claim 2, wherein the first and/or second peripheral interface device are arranged on the luminaire housing or integrated in the luminaire housing.

4. The luminaire system according to claim 1, wherein at least one of the first and second peripheral interface device is a wireless communication device.

5. The luminaire system according to claim 1, wherein the first or second peripheral interface device comprises an antenna configured for receiving and emitting cellular data.

6. The luminaire system according to claim 1, wherein the transfer module comprises a storage means configured to store data content included in the first and/or second signals, or processed data derived from said data content.

7. The luminaire system according to claim 1, further comprising:

a driver comprising a driver housing with input connector elements for connection to a power supply and output connector elements for connection to the at least one light source; and driver circuitry arranged in said driver housing and adapted to perform a driving functionality of the at least one light source.

8. The luminaire system according to claim 7, wherein the driver circuitry is further configured to perform a driving functionality of at least one of the first and second peripheral interface device, and wherein the driver housing is further provided with output connector elements for connection to at least one of the first and second peripheral interface device.

9. The luminaire system according to claim 7, wherein the transfer module and the control means are provided in the driver housing.

10. The luminaire system according to claim 8, wherein the driver housing is provided with at least one first and second control connector element connected to the first and the second interface, respectively.

11. The luminaire system according to claim 7, wherein the driver housing is provided with a receiving means configured for receiving at least one pluggable module, such that the at least one pluggable module can be received from outside of the driver housing, wherein the at least one pluggable module comprises at least a portion of the first and/or second interface and/or of the transfer module and/or of the control means.

12. The luminaire system according to claim 11, wherein the driver housing is provided with at least one recess for receiving the at least one pluggable module.

13. A luminaire system comprising:

a light module with at least one light source;

a first peripheral interface device and a second peripheral interface device;

a first interface configured to receive first signals from the first peripheral interface device using a first protocol;

a second interface configured to send second signals to the second peripheral interface device using a second protocol, wherein the first protocol and the second protocol are different;

a transfer module configured to transfer first data content included in a first input signal received at the first interface and/or first processed data based on said first data content, to the second interface;

a control means configured to control the signaling between the first interface, the transfer module and the second interface such that, when said first input signal is received, a second output signal according to the second protocol is generated at said second interface, said second output signal including said first data content and/or said first processed data; and wherein the first peripheral interface device is a sensor and the second peripheral device is a communication device.

14. The luminaire system of claim 13, wherein the second peripheral device is a wireless communication device.

15. The luminaire system of claim 13, wherein the first peripheral interface device is any one of the following: a light sensor, a particle sensor, an image sensor, a camera, a microphone, a radar, a motion sensor, a voice recorder, a detector of smoke.

16. The luminaire system of claim 13, wherein the sensor is arranged on the luminaire housing or integrated in the luminaire housing.

17. A luminaire system comprising:

a light module with at least one light source;

a first peripheral interface device and a second peripheral interface device;

a first interface configured to receive first signals from the first peripheral interface device using a first protocol;

a second interface configured to send second signals to the second peripheral interface device using a second protocol, wherein the first protocol and the second protocol are different;

a transfer module configured to transfer first data content included in a first input signal received at the first interface and/or first processed data based on said first data content, to the second interface;

a control means configured to control the signaling between the first interface, the transfer module and the second interface such that, when said first input signal is received, a second output signal according to the second protocol is generated at said second interface, said second output signal including said first data content and/or said first processed data; and wherein the first peripheral interface device is a communication device and the second peripheral device is a sensor.

18. The luminaire system of claim 17, wherein the first peripheral device is a wireless communication device.

19. The luminaire system of claim 17, wherein the second peripheral interface device is any one of the following: a light sensor, a particle sensor, an image sensor, a camera, a microphone, a radar, a motion sensor, a voice recorder, a detector of smoke.

* * * * *